US011305360B2

(12) United States Patent
Kress

(10) Patent No.: US 11,305,360 B2
(45) Date of Patent: Apr. 19, 2022

(54) MILLING HEAD FOR A BALL TRACK MILLING CUTTER, BALL TRACK MILLING CUTTER HAVING A MILLING HEAD OF THIS TYPE, METHOD FOR PRODUCING A CUTTING EDGE FOR A BALL TRACK MILLING CUTTER, COMPUTER PROGRAM PRODUCT FOR CARRYING OUT A METHOD OF THIS TYPE, DATA CARRIER HAVING A COMPUTER PROGRAM PRODUCT OF THIS TYPE, AND GRINDING MACHINE FOR CARRYING OUT THE METHOD

(71) Applicant: MAPAL FABRIK FÜR PRÄZISIONSWERKZEUGE DR. KRESS KG, Aalen (DE)

(72) Inventor: Dieter Kress, Aalen (DE)

(73) Assignee: Mapal Fabrik für Praäzisionswerkzeuge Dr. Kress KG, Aalen (DE)

( * ) Notice: Subject to any disclaimer, the term of this patent is extended or adjusted under 35 U.S.C. 154(b) by 15 days.

(21) Appl. No.: 16/494,174

(22) PCT Filed: Mar. 15, 2018

(86) PCT No.: PCT/EP2018/056588
§ 371 (c)(1),
(2) Date: Sep. 13, 2019

(87) PCT Pub. No.: WO2018/167234
PCT Pub. Date: Sep. 20, 2018

(65) Prior Publication Data
US 2020/0070258 A1    Mar. 5, 2020

(30) Foreign Application Priority Data

Mar. 16, 2017 (DE) ...................... 10 2017 204 369.8
Apr. 10, 2017 (DE) ...................... 10 2017 206 144.8

(51) Int. Cl.
*B23C 5/10* (2006.01)

(52) U.S. Cl.
CPC .... *B23C 5/1018* (2013.01); *B23C 2210/0414* (2013.01); *B23C 2210/084* (2013.01)

(58) Field of Classification Search
CPC .... B23C 2210/0414; B23C 2210/0421; B23C 2210/084; B23C 2226/125; B23C 2226/315; B23C 5/10; B23C 5/1018
See application file for complete search history.

(56) References Cited

U.S. PATENT DOCUMENTS 2,557,404 A * 6/1951 Armitage .............. B23C 5/2265
407/38
4,566,828 A * 1/1986 Reinauer ............... B23C 5/1036
407/48

(Continued)

FOREIGN PATENT DOCUMENTS

CN      1669737 A      9/2005
CN    201342509 Y    11/2009
(Continued)

OTHER PUBLICATIONS

Office Action dated May 21, 2020 in corresponding Chinese Patent Application No. 201880018634.6. Translation provided by P.C. & Associates.

(Continued)

*Primary Examiner* — Nicole N Ramos
(74) *Attorney, Agent, or Firm* — Harness, Dickey & Pierce, P.L.C.; Stephen T. Olson

(57) ABSTRACT

A milling head for a ball track milling cutter includes an imaginary center axis, a first, working-side end and a second, clamping-side end opposite the first end when viewed along the central axis, and comprising at least one geometrically defined cutting edge, extending along a cutting edge profile of the cutting edge from a first cutting edge (Continued)

end facing the first end of the milling head in the direction of the second end of the milling head up to a second cutting edge end facing the second end of the milling head, wherein at least one cutting edge is formed as an intersecting line between the rake face associated with at least one cutting edge and a first flank face associated with at least one cutting edge, wherein at least one cutting edge is assigned a negative rake angle, a first clearance angle and a wedge angle. It is provided that a value of the negative rake angle in the region of the first cutting edge end has a different value than in the region of the second cutting edge end, that the first clearance angle in the region of the first cutting edge end has a different value than in the region of the second cutting edge end, and that the wedge angle along the cutting edge profile is constant.

18 Claims, 2 Drawing Sheets

(56) References Cited

U.S. PATENT DOCUMENTS

| | | | |
|---|---|---|---|
| 5,486,073 A * | 1/1996 | Satran | B23C 5/2221 |
| | | | 407/113 |
| 7,081,039 B2 | 7/2006 | Dilger et al. | |
| 7,878,739 B2 | 2/2011 | Maeda | |
| 8,870,498 B2 | 10/2014 | Maeda et al. | |
| 8,882,406 B2 | 11/2014 | Hobohm et al. | |
| 2001/0051076 A1* | 12/2001 | Kunimori | B23B 31/1075 |
| | | | 407/35 |
| 2005/0202759 A1 | 9/2005 | Dilger et al. | |
| 2009/0245946 A1 | 10/2009 | Maeda | |
| 2009/0324347 A1* | 12/2009 | Kirby | B23C 5/10 |
| | | | 407/53 |
| 2011/0123280 A1* | 5/2011 | Hobohm | B23C 5/1081 |
| | | | 407/34 |
| 2011/0211922 A1 | 9/2011 | Maeda et al. | |
| 2013/0051937 A1 | 2/2013 | Volokh et al. | |
| 2013/0051940 A1 | 2/2013 | Hobohm et al. | |
| 2014/0227050 A1* | 8/2014 | Budda | B23C 5/10 |
| | | | 407/54 |
| 2015/0224585 A1 | 8/2015 | Kuroda | |
| 2015/0290724 A1* | 10/2015 | Sharivker | B21H 3/10 |
| | | | 407/54 |
| 2019/0283149 A1* | 9/2019 | Touma | B23C 5/207 |
| 2020/0254531 A1* | 8/2020 | Kannwischer | B23B 31/1122 |

FOREIGN PATENT DOCUMENTS

| | | | | |
|---|---|---|---|---|
| CN | 201405113 Y | 2/2010 | | |
| CN | 102596464 A | 7/2012 | | |
| CN | 104428089 A | 3/2015 | | |
| CN | 105642985 A | 6/2016 | | |
| DE | 102009015014 A1 | 10/2009 | | |
| DE | 102011012140 A1 | 8/2012 | | |
| DE | 112009002613 B4 | 1/2013 | | |
| DE | 102014208125 A1 | 5/2015 | | |
| EP | 0456253 A1 | 11/1991 | | |
| EP | 1577055 A2 | 9/2005 | | |
| EP | 1864736 A2 * | 12/2007 | | B23G 5/06 |
| EP | 2913132 A1 | 9/2015 | | |
| JP | H06218612 A | 8/1994 | | |
| WO | WO-2010047428 A1 * | 4/2010 | | B23C 5/10 |
| WO | WO-2014044239 A3 * | 6/2014 | | B23C 5/28 |

OTHER PUBLICATIONS

International Preliminary Report on Patentability (Chapter I) dated Sep. 17, 2019 with English Translation of the Written Opinion of the International Searching Authority.
International Search Report (in English and German) and Written Opinion (in German) issued in PCT/EP2018/056588, dated Jul. 25, 2018; ISA/EP.
Office Action for JP 2019-550604, dated Jan. 11, 2022.

* cited by examiner

MILLING HEAD FOR A BALL TRACK MILLING CUTTER, BALL TRACK MILLING CUTTER HAVING A MILLING HEAD OF THIS TYPE, METHOD FOR PRODUCING A CUTTING EDGE FOR A BALL TRACK MILLING CUTTER, COMPUTER PROGRAM PRODUCT FOR CARRYING OUT A METHOD OF THIS TYPE, DATA CARRIER HAVING A COMPUTER PROGRAM PRODUCT OF THIS TYPE, AND GRINDING MACHINE FOR CARRYING OUT THE METHOD

CROSS-REFERENCE TO RELATED APPLICATIONS

This application is a 371 U.S. National Phase of International Application No. PCT/EP2018/056588, filed Mar. 15, 2018, which claims the benefit of German Patent Application No. 10 2017 204 369.5, filed Mar. 16, 2017, and German Patent Application No. 10 2017 206 144.8, filed Apr. 10, 2017. The entire disclosures of the above applications are incorporated herein by reference.

The invention relates to a milling head for a ball track milling cutter, a ball track milling cutter with this type of milling head, a method for producing a cutting edge for a ball track milling cutter, a computer program product for performing the method, a data carrier with the computer program product, and a grinding machine for carrying out the method.

A ball track milling cutter of the type mentioned here is known, for example, from the German published patent application DE 10 2014 208 125 A1. A milling head for such a ball track milling cutter has an imaginary center axis and one working-side end and a second clamping-side end opposite the first end when viewed along the center axis. The milling head also has at least one geometrically defined cutting edge which, starting from a first cutting edge end facing the first end of the milling head, extends in the direction of the second end of the milling head up to a second cutting edge end facing the second end of the milling head along a cutting edge profile. At least one cutting edge is formed as an intersecting line between a rake face and a flank face, which are respectively associated with the cutting edge, and which intersect along the cutting edge. At least one cutting edge is also assigned a negative rake angle, a first clearance angle and a wedge angle.

Known milling heads have a limited service life, wherein in the region of the at least one cutting edge sharp edges form, in particular with prolonged use, which in turn leads to chipping along the cutting edge profile. Wear is not uniformly distributed along the cutting edge profile, but instead has a pronounced wear profile. In the region of the second cutting edge end the at least one cutting edge wears much faster and more than in the region of the first cutting edge end.

It is an object of the invention to provide, a milling head for a ball track milling cutter, a ball track milling cutter with such a milling head, a method for producing a cutting edge for a ball track milling cutter, a computer program product for performing such a method, a data carrier with such a computer program product, and a grinding machine for implementing the method, wherein the mentioned disadvantages do not occur.

The object is achieved by providing the objects in the independent claims. Advantageous embodiments are described in the dependent claims.

The object is achieved in particular by providing a milling head for a ball track milling cutter of the type described above, which is characterized in that the negative rake angle in the region of the first cutting edge end, in particular at the first cutting edge end, has a different value than in the region of the second cutting edge end, in particular at the second cutting edge end. The first clearance angle also has a different value in the region of the first cutting edge end, in particular on the first cutting edge end, than in the region of the second cutting edge end, in particular on the second cutting edge end. The wedge angle is constant along the cutting edge profile. Thus, while the wedge angle along the cutting edge profile does not change from the first cutting edge end to the second cutting edge end, the negative rake angle on the one hand and the clearance angle on the other hand have a value in the region of the first cutting edge end which is different from a value that is given in the region of the second cutting edge end. In this way, the geometric configuration of at least one cutting edge is in different regions along its cutting edge profile adapted to a respective current engagement situation during the machining of a workpiece, whereby the wear of the cutting edge is reduced and vibrations during machining of the workpiece are advantageously reduced. This also contributes to a longer service life of the milling head.

Milling heads and ball track milling cutters of the type mentioned here are used in particular for the production of joints of universal shafts, in particular for the production of ball running surfaces of homokinetic joints. They serve in particular to produce ball treads, also referred to as ball tracks, both in the outer part of such a joint and in its inner part. Such a milling head is used for machining a ball running surface at a certain lead angle relative to a workpiece to be machined. The lead angle is the angle which the imaginary center axis of the milling head assumes with respect to a tangent applied to a momentary point of contact of the cutting edge of the milling head with the workpiece surface. At least one cutting edge touches the workpiece to be machined punctiform or at least approximately punctiform in the region of the point of contact, which is not constant during the machining of the workpiece on the cutting edge, but instead is displaced along the cutting edge profile. This results in particular from the final lead angle of the milling head on the one hand, and from the specific relative movement between the milling head and the workpiece to be machined, which is provided for generating a ball running surface in the workpiece, on the other. As this occurs, a relative rotation takes place about the imaginary center axis for generating the ball running surface along an imaginary circumference on the one hand and on the other hand, a suitable relative displacement between the workpiece and the milling head to produce the ball running surface along a length on the same—perpendicular to the imaginary circumference occurs. It is particularly preferable that the milling head is rotated about the imaginary center axis, while at the same time the workpiece—preferably in an elliptical motion—is guided around the imaginary center axis of the milling head, such that the ball running surface is formed along its entire length. While the ball running surface is being processed, at least one cutting edge enters into the workpiece to be machined from the first cutting edge end, whereby the point of contact on the cutting edge shifts from the first cutting edge end towards the second cutting edge end as machining continues. In the place where the cutting edge enters into the material of the in particular semi-circularly designed ball tread, and where it emerges from this material again, skips in the applied cutting force occur, which are also referred to as interruptions in the cutting force, and contribute to unwanted vibrations in the milling head. This has a negative effect on both chip formation and service life. The adapted geometry proposed here of at least one cutting edge allows its adaption to the displacement of the point of contact in the course of workpiece machining and at the same time a reduction in the vibrations described above, so that overall the service life of the milling head is improved.

It is possible that the milling head has only one and exactly one geometrically defined cutting edge. However, it is also possible in another embodiment that the milling head has a multitude of geometrically defined cutting edges, in particular two geometrically defined cutting edges, three geometrically defined cutting edges, four geometrically defined cutting edges, or five geometrically defined cutting edges. Of course, a larger number of geometrically defined cutting edges is also possible. Most preferably, however, the milling head has four geometrically defined cutting edges. Preferably, all geometrically defined cutting edges on the milling head are identical and in particular formed as is explained here and below for at least one geometrically defined cutting edge.

The milling head can be formed in one piece with other elements of a ball track milling cutter, in particular with a ball track milling cutter main body, so that this is in particular a milling head for a ball track milling cutter. However, it can also be formed in several parts with the remaining parts of the ball track milling cutter, where, for example, it can be connected with the ball track milling cutter main body via an interface, such as by means of a thread having a subsequent centering cone and a plane surface for positionally accurate fixation of the milling head on the ball track milling cutter main body surrounding the centering cone in the circumferential direction. Such one-piece and multi-piece designs, and corresponding interfaces in particular, are known, so they will not be discussed in detail.

A working-side end of the milling head is understood in particular to be the end—viewed along the imaginary center axis—that is intended to face the workpiece during machining of a workpiece by the milling head. A clamping-side end of the milling head, in contrast, is understood to mean—viewed along the central axis—an end facing away from the workpiece during machining of a workpiece, this end being associated with a clamping section of the milling head or the ball track milling cutter. As explained above, the milling head is adapted to be connected to the clamping section with a ball track milling cutter main body. The ball track milling cutter may in turn be adapted to be connected to a suitably designed clamping section with other tool elements, such as adapters, spacers, extensions, etc., or directly to a machine spindle. For this purpose, the ball track milling cutter may in particular have a clamping shaft that is suitable for being clamped into another tool part and/or a machine spindle. Such a clamping shaft may, for example, be designed cylindrical, conical, for example, as a Morse taper or a hollow shaft taper (HST).

The fact that the rake face is associated with at least one cutting edge means, in particular, that the rake face adjoins at least one cutting edge directly. Accordingly, the first flank face connects directly to the cutting edge. This results in particular from the fact that the cutting edge is formed as an intersecting line of the rake face with the first flank face.

The fact that at least one cutting edge is assigned a negative rake angle means in particular that the rake face has a negative rake angle. Such a negative rake angle is particularly advantageous for machining hard materials that are machined with a cutting material with high hardness and temperature resistance. Typically, workpieces of the type discussed here are machined in already hardened form with the milling head. Higher cutting forces and shorter chips can be achieved with a negative rake angle. Suitable hard cutting materials, because of their internal crystalline structure, have the property of being resistant to compressive stresses that occur at a negative rake angle. At the same time, they also have a high hardness and temperature resistance. In contrast, a positive rake angle would produce a tensile stress when chip breakage occurs, which would cause a corresponding hard cutting material to fail very quickly. Specifically, such hard cutting materials exhibit poor behavior in response to tensile stresses, in particular a low internal resistance of the material to stress. Therefore, with positive rake angles, they tend to easily chip on the cutting edge.

Furthermore, it should be noted that the wedge angle for machining hard, brittle materials should be as great as possible in order to guarantee the necessary robustness in the machining of materials with high strength and hardness.

The rake angle is an angle that the rake face with an imaginary plane in which the cutting edge extends, and which is locally perpendicular to a workpiece surface machined by the cutting edge. The rake angle has a positive value when the rake face is reset relative to the imaginary plane, i.e. when viewed against the machining direction—while the rake angle is associated with a negative sign when the rake face—when viewed in the machining direction—precedes the cutting edge, i.e. is positioned in the machining direction in front of the imaginary plane.

The clearance angle is an angle that the flank face forms with a machined workpiece plane or a tangent plane applied to the machined workpiece in the region of the cutting edge, the cutting edge also lying in this workpiece plane or tangential plane. The workpiece plane or tangential plane used for determining the clearance angle on the one hand and the imaginary plane used to determine the rake angle are perpendicular to one another and intersect in the cutting edge. In particular, the clearance angle ensures that the milling head is released from the machined workpiece surface, minimizing friction and heating between the cutting edge and the machined material.

The wedge angle is the angle that both the rake face and the first flank face form together.

It is the general rule that the rake angle—taking into account the sign assigned to it—the first clearance angle and the wedge angle always add up to 90°—based on a full circle of 360°.

The wedge angle can therefore be calculated from the rake angle—taking into account its sign—and the first clearance angle. Conversely, the first clearance angle results from the wedge angle and the rake angle.

According to a further embodiment of the invention, it is provided that no two different points along the cutting edge exist on at least one cutting edge, where at least one cutting edge has identical values for the rake angle and/or identical first clearance angles. This means, in particular, that the value of the negative rake angle and/or the first clearance angle is/are not the same at any two different points along the cutting edge profile on the cutting edge. The value of the negative rake angle is therefore different at each point along the cutting edge profile. Alternatively or additionally, the clearance angle is different at each point along the cutting edge profile. This leads to a particularly favorable geometric cutting geometry for reducing vibrations occurring during the machining of a workpiece and for increasing the service life of the milling head.

According to a further embodiment of the invention, it is provided that the value of the negative rake angle and/or the first clearance angle vary/varies continuously along the cutting edge profile. In this context, a continuous variation is understood as meaning, in particular, a continuous change, in particular a continuous and differentiable change, of the values for the value of the rake angle and/or the first clearance angle, wherein, in particular, no jumps occur in the corresponding values. Particularly preferably, the value of the negative rake angle and/or the first clearance angle along the cutting edge profile of at least one cutting edge change/ changes linearly. Thus, abrupt changes in the cutting geometry are avoided, which has a favorable effect on the prevention of vibrations and an increased service life of the milling head.

According to a further embodiment of the invention, it is provided that the value of the negative rake angle in the region of the first cutting edge end, in particular at the first cutting edge end, is lower than in the region of the second cutting edge end, in particular at the second cutting edge end. Alternatively or additionally, it is preferably provided that the first clearance angle in the region of the first cutting edge end, in particular at the first cutting edge end, is lower than in the region of the second cutting edge end, in particular at the second cutting edge end. In this way, the durability and robustness of the cutting geometry is adjusted so that at least one cutting edge has higher robustness along its cutting edge profile in the place where it would otherwise be subject to increased wear, and is also designed for easier cutting where it typically has less wear. Thus, the wear over the profile of the cutting edge in particular can be made uniform, by which means the overall service life of the free head is increased. The constant wedge angle along the profile of the cutting edge ensures that the robustness and stability of the cutting geometry are not decreased anywhere in the cutting edge profile by a reduced wedge angle.

By changing the negative rake angle and the clearance angle along the cutting edge profile on the one hand and the constant wedge angle on the other hand, the cutting geometry is rotated, so to speak, in the profile of the cutting edge from the first cutting edge end to the second cutting edge end—when viewed in the cross section. The rake face in particular has a twisted profile along the cutting edge due to the progressions of the rake angle and the clearance angle, a normal vector of the rake face being twisted, so to speak, in the profile of the cutting edge from the first cutting edge end to the second cutting edge end toward an outer circumference of the milling head. This produces higher robustness in the cutting geometry, in particular in the region of the second cutting edge end, that is to say where increased wear occurs in conventional milling heads.

According to a further embodiment of the invention, it is provided that the value of the negative rake angle along the cutting edge profile—in particular from the first cutting edge end to the second cutting edge end—increases to the same extent to which the first clearance angle also increases. The value of the rake angle thus increases in particular in the same ratio as the value of the first clearance angle.

For the sake of clarification, it should be added that the negative rake angle—everywhere in the cutting edge profile—becomes smaller and smaller, i.e. it changes to more negative values as its value increases from the first cutting edge end towards the second cutting edge end.

According to a further embodiment of the invention, it is provided that a width of the rake face in the region of the first cutting edge end, in particular at the first cutting edge end, is greater than in the region of the second cutting edge end, in particular at the second cutting edge end. In this case, the width of the rake face preferably changes continuously along the cutting edge profile from the first cutting edge end to the second cutting edge end, preferably linearly with the cutting edge profile in particular. In particular, the width of the rake face preferably decreases continuously, in particular linearly, from the first cutting edge end to the second cutting edge end. This is the result with a given contour of the cutting edge, that is to say with a predetermined cutting edge profile from the development of the rake angle on the one hand and the first clearance angle on the other hand along the cutting edge profile.

The rake face proposed here, variable with respect to its width and twisted along its profile, is also referred to as a tracking negative chamfer. It enables, in the region of the second cutting edge end in particular, increased robustness of the cutting geometry and thus an improved service life of the milling head with simultaneously reduced vibrations.

According to a further embodiment of the invention, it is provided that the width of the rake face in the region of the first cutting edge end is at most 0.4 mm, preferably at most 0.3 mm, wherein the width of the rake face in the region of the second cutting edge end is at least 0.1 mm, preferably at least 0.15 mm. With these values, the advantages already described are realized in a particular way.

According to a further embodiment of the invention, it is provided that the cutting edge profile is straight, curved and/or spirally formed. The cutting edge profile may in particular be aligned parallel to the imaginary center axis, or form a finite angle with the imaginary center axis. It is possible that this angle is varied or constant along the cutting edge profile. The embodiment of the cutting edge profile described here relates in particular to an imaginary projection of the actual cutting edge profile in space onto an imaginary cylindrical peripheral surface which extends concentrically around the center axis. In fact, the cutting edge profile is always curved because the milling head is at least formed hemispherically or approximately hemispherically in the region of at least one cutting edge. However, this curvature disappears when projected onto an imaginary, cylindrical circumferential surface about the center axis, so that it is particularly easy to judge in this projection whether the cutting edge is aligned parallel to the central axis, at an angle to the central axis, or spirally formed around the central axis.

Overall, the milling head thus has, at least in the region of its working-side end, a hemispherical or at least approximately hemispherical geometry, the curvature of which at least one cutting edge follows, wherein in particular in this way a ball track can be produced, in particular with a diameter corresponding to the diameter of the imaginary hemisphere.

According to a further embodiment of the invention, it is provided that the amount of the negative rake angle in the region of the first cutting edge end, in particular at the first cutting edge end, is from at least 10° to at most 19°, preferably from at least 12° to at most 17°, preferably from at least 14° to at most 16°, preferably 15°. Alternatively or additionally, the value of the negative rake angle in the region of the second cutting edge end, in particular at the second cutting edge end, is preferably from at least 20° to at most 30°, preferably from at least 22° to at most 28°, preferably from at least 24° to at most 26°, preferably 25°.

Alternatively or additionally, the first clearance angle in the region of the first cutting edge end, in particular at the first cutting edge end, is from at least 5° to at most 10°, preferably from at least 6° to at most 8°, preferably 7°. Alternatively or additionally, the first clearance angle, preferably in the region of the second cutting edge end, preferably at the second cutting edge end, from at least 15° to at most 20°, preferably from at least 16° to at most 18°, preferably 17°.

At the values specified here for the value of the negative rake angle and/or the first clearance angle, the advantages of the milling head already described above are realized in a particular way.

According to a further embodiment of the invention, it is provided that the first flank face circumferentially adjoins a second flank face, which is associated with a second clearance angle. In this case, the term "peripherally" refers in particular to a circumferential line which concentrically surrounds the imaginary center axis. The second flank face is in particular immediately adjacent to the first flank face, wherein the first flank face is positioned between the cutting edge and the second flank face.

Preferably, the second clearance angle is greater everywhere along the cutting edge profile than the first clearance angle.

According to a further embodiment of the invention, it is provided that the second clearance angle is constant along the cutting edge profile. In particular, it is preferably from at least 16° to at most 21°, preferably from at least 17° to at most 19°, preferably 18°.

The second flank face, which in comparison to the first flank face decreases more sharply—when viewed in the machining direction—enables improved clearance and reduced friction as well as heat between the cutting edge and the machined material while maintaining a robust cutting geometry.

According to a further embodiment of the invention it is provided that the milling head has a main body. It is possible that at least one cutting edge is formed directly on the main body, in particular machined from the main body. Alternatively, it is possible that at least one cutting edge is formed on a cutting insert connected to the main body.

The main body preferably has a solid carbide or consists of a solid carbide. In the case in which the cutting edge is formed directly on the main body, the main body preferably has a hard material layer at least partially applied, in particular pressed onto the solid carbide, preferably made from cubic boron nitride (CBN), polycrystalline cubic boron nitride (PCBN), or polycrystalline diamond (BKD), wherein at least one cutting edge formed on the hard material layer is in particular machined out of the hard material layer. If, in contrast, at least one cutting edge is formed on a cutting insert connected to the main body, the main body may consist in particular of solid carbide, wherein the cutting insert preferably comprises a hard material or is formed from a hard material, wherein the cutting insert in particular comprises a material or consists of a material selected from a group consisting of cubic boron nitride (CBN), polycrystalline cubic boron nitride (PCBN), and polycrystalline diamond (PCD).

The cutting insert is preferably connected to the main body in particular by soldering, preferably by brazing. In particular, it is possible that the cutting insert is soldered into the main body.

It is also possible in principle that the cutting insert is attached to the main body in a different manner, for example by screw clamping, whereby it can be exchanged for a new cutting insert especially easily after reaching the end of a service life. In this case, however, due to the less stable arrangement of the cutting insert compared to soldering and the resulting inaccuracies when exchanged, shorter service life results. In addition, exchangeable cutting inserts may lead to increased inaccuracies in the machining and ultimately increased tolerance deviations in the machined workpiece. By comparison, firmly soldered cutting inserts lead to a significant increase in service life and avoid inaccuracies when exchanged, so that the machining accuracy increases and the achievable tolerances on the machined workpiece can be improved.

The object is also achieved by providing a ball track milling cutter that has a milling head according to one of the embodiments described above. In particular, the advantages that have already been explained in connection with the milling head are realized in connection with the ball track milling cutter. As also already explained, the milling head may be formed in one piece with remaining parts of the ball track milling cutter, in particular with a ball track milling cutter main body. But it is also possible that the milling head is formed in several pieces with the ball track milling cutter base body and can be attached to it by means of a suitable interface. This embodiment has the advantage that the milling head can be replaced at the end of its service life in a simple manner, without the ball track milling cutter main body needing to be disposed of and replaced at the same time.

The object is also achieved by providing a method for producing a cutting edge for a ball track milling cutter, in which the cutting edge is produced by grinding directly on a main body of a milling head or on a cutting insert for a milling head, wherein the cutting edge is produced as an intersecting line between a rake face and a flank face, wherein the cutting edge is formed with a negative rake angle whose value is different in the region of a first cutting edge end facing an intended working-side end of the milling head than in the region of a second cutting edge end facing an intended clamping-side end of the milling head, wherein the cutting edge is formed with a clearance angle that has a different value in the region of the first cutting edge end than in the region of the second cutting edge end, and wherein the cutting edge is formed with a wedge angle, which is constant along a cutting edge profile of the cutting edge between the first cutting edge end and the second cutting edge end. In connection with the method, the advantages already explained in connection with the milling head on the one hand and the ball track milling cutter on the other hand are in particular realized.

In particular, the main body or the cutting insert is ground, wherein the cutting edge is produced by grinding the main body or the cutting insert as an intersecting line between the rake face and the flank face.

In particular, the cutting edge is made by grinding at least one surface selected from the rake face and the flank face, preferably by grinding the rake face and the flank face, as an intersecting line between the flank face and the rake face.

If the cutting edge is produced on a cutting insert for a milling head, this is preferably done according to a first embodiment of the method after fastening the cutting insert to a milling head, in particular after soldering the cutting insert onto the milling head or soldering it into the milling head. The cutting insert(s) is/are preferably brazed to the milling head. Alternatively, according to another embodiment of the method, it is possible for the cutting insert to be ground prior to attachment to the milling head, thereby producing the cutting edge. However, it is possible that in this case, the cutting edge is subsequently processed after attaching the cutting insert to the milling head, in particular to ensure the dimensional accuracy of the cutting edge.

By using the method, in particular by producing the cutting edge directly on the main body of the milling head or on the cutting insert, a milling head according to the invention or a milling head according to one of the embodiments described above is preferably obtained. The cutting insert can be attached to the milling head after grinding if necessary, in particular by soldering, preferably by brazing.

The object is also achieved by providing a computer program product with machine-readable instructions for carrying out a method according to this invention or method according to one of the previously described embodiments when the computer program product is running on a computing device set up for controlling a grinding machine and preferably operatively connected with the grinding machine for controlling the same. Due to the machine-readable instructions, the computing device then controls in particular the grinding machine such that the cutting edge is produced. In connection with the computer program product, in particular, the advantages that have already been explained in connection with the milling head and/or the ball track milling cutter result.

The computer program product comprises in particular machine-readable instructions on the basis of which a main body of a milling head or a cutting insert for such a milling head arranged on or in the grinding machine is ground, wherein the cutting edge is produced by grinding an intersecting line between a rake face and a flank face, in particular by grinding at least one face, selected from the flank face and the rake face with the grinding machine. Preferably, the flank face and the rake face are ground by the grinding machine.

The object is also achieved by providing a data carrier on which a computer program product according to the invention or a computer program product according to one of the embodiments described above is stored. The data carrier is preferably designed as a volatile or non-volatile data carrier. The data carrier may in particular be a main memory of a computing device, a read-only memory, in particular a hard disk or hard disk device of the computing device, or a mobile data carrier, for example tape storage, a floppy disk, a CD-ROM, a DVD, a USB stick, a memory card, or similar. The data carrier may also be designed as a data cloud, i.e. in particular as a network memory of a multitude of computing devices, in particular as a Cloud.

In particular in connection with the data carrier, the advantages already explained in connection with the milling head or the ball track milling cutter are realized.

Finally, the object is also achieved by providing a grinding machine set up for carrying out a method according to this invention or a method according to one of the previously described embodiments. In particular in connection with the grinding machine, the advantages that have already been explained in connection with the milling head or the ball track milling cutter are realized.

The grinding machine preferably has a computing device that runs a computer program product according to the invention or a computer program product according to one of the embodiments described above. Alternatively or additionally, the grinding machine preferably has a data carrier according to the invention or a data carrier according to one of the previously described embodiments.

The method is in particular designed to produce a milling head according to the invention or a milling head according to one of the embodiments described above. In this respect, the method preferably has at least one method step, which is based on at least one feature or a combination of features of the milling head according to this invention or a milling head according to one of the described embodiments. In particular, method steps that have been explained explicitly or implicitly in connection with the milling head, preferably individually or in combination with each other, comprise steps for a preferred embodiment of the method.

The invention will be explained in more detail below with reference to the drawing. In the figures.

Figure 1:
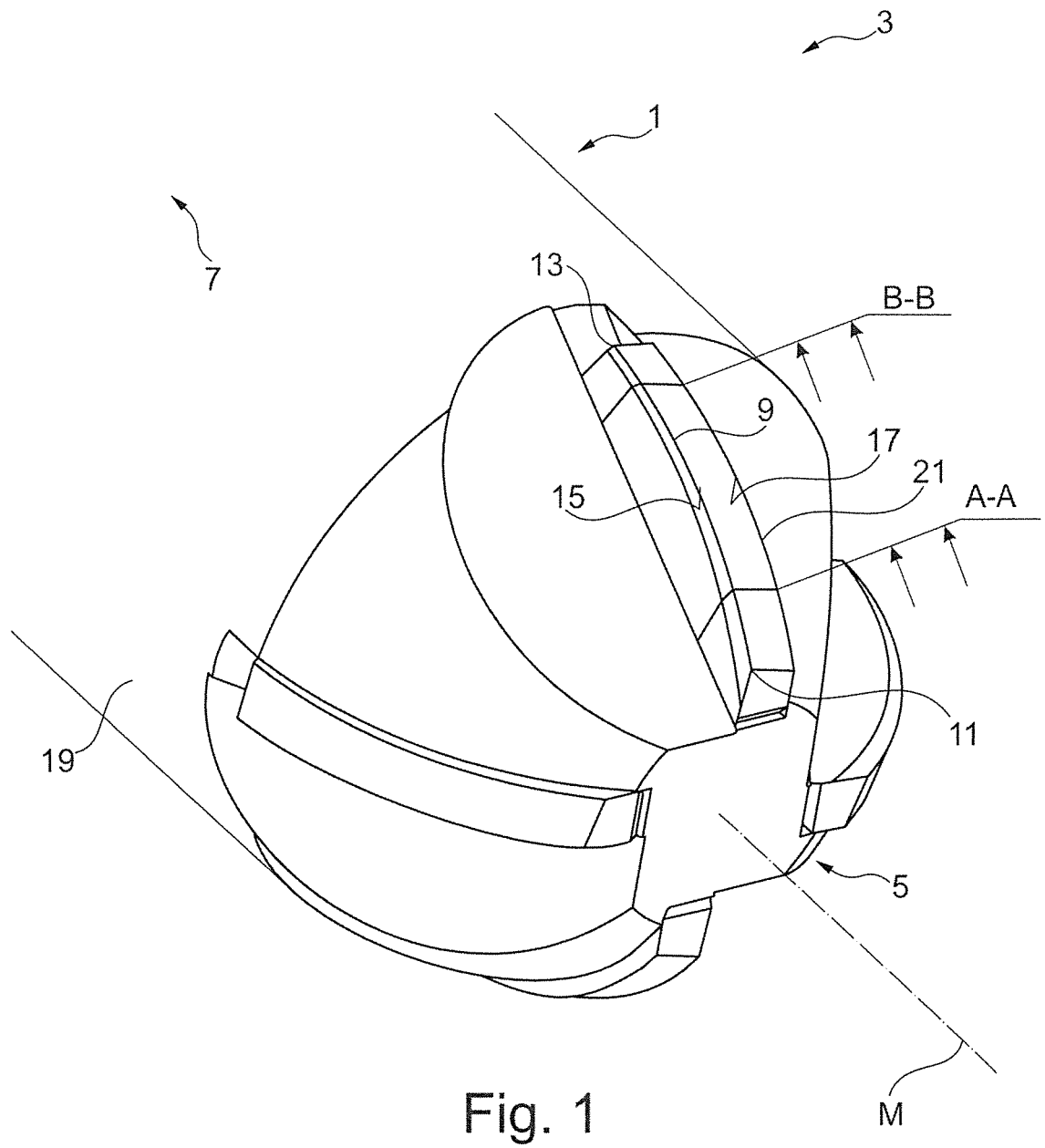
FIG. 1 shows a detailed depiction of an embodiment of a milling head for a ball track milling cutter.

FIG. 1 shows a detailed depiction of a first embodiment of a milling head 1 for a—not shown beyond milling head 1—ball track milling cutter 3. The milling head 1 has an imaginary center axis M, which corresponds to a rotational axis of the milling head 1 and also of the ball track milling cutter 3 during the intended machining of a workpiece, not shown. The milling head 1 and in particular also the ball track milling cutter 3 is/are therefore preferably rotated about the center axis M during the machining of a workpiece.

The milling head 1 has a first, working-side end 5 and a second, clamping-side end 7 opposite the first end 5 along the center axis M, which clamping-side end 7 is no longer shown here on the detailed illustration of FIG. 1, wherein the first end 5 faces the workpiece during the machining of a workpiece as intended, wherein the second end 7 faces a clamping portion of the ball track milling cutter 3 or has a clamping portion of the milling head 1.

The milling head 1 also has at least one geometrically defined cutting edge, here a total of four geometrically defined cutting edges, only one of which is designated by the reference numeral 9 for better clarity.

Everything that is explained below for the geometrically defined cutting edge 9, which is explicitly designated here, applies in just the same way to the other three geometrically defined cutting edges of the milling head 1, which are not specifically designated for the sake of better clarity. The four geometrically defined cutting edges 9 are therefore all identically designed. Therefore for the sake of simplicity, only one geometrically defined cutting edge 9 will be described in detail below.

The geometrically defined cutting edge 9 extends, starting from a first cutting edge end 11 facing the first end 5, in the direction of the second end 7 to a second cutting edge end 13 along a cutting edge profile, wherein the term "cutting edge profile" describes the profile of the geometrically defined cutting edge 9 starting from the first cutting edge end 11 to the second cutting edge end 13.

The cutting edge 9 is formed as an intersecting line between a rake face 15 and a first flank face 17, which are respectively associated with the cutting edge 9. The rake face 15 has a negative rake angle. In addition to the negative rake angle, the cutting edge 9 is assigned a first clearance angle and a wedge angle, which are explained in more detail in connection with FIGS. 2 and 3.

In the milling head 1, it is in particular provided that a value of the negative rake angle in the region of the first cutting edge end 11 will have a different value than in the region of the second cutting edge end 13, wherein the first clearance angle in the region of the first cutting edge end 11 has a different value than in the region of the second cutting edge end 13. The wedge angle is constant along the cutting edge profile from the first cutting edge end 11 to the second cutting edge end 13.

In particular, the cutting edge 9 along the cutting edge profile does not have two mutually different points at which the values for the negative rake angle and/or the first clearance angle would be equal. Particularly preferably, the value of the rake angle and/or the first clearance angle vary continuously, in particular linearly along the cutting edge profile of the cutting edge 9.

The value of the negative rake angle is preferably smaller in the region of the first cutting edge end 11, in particular at the first cutting edge end 11, than in the region of the second cutting edge end 13, in particular at the first cutting edge end 13. Alternatively or additionally, the first clearance angle in the region of the first cutting edge end 11, in particular at the first cutting edge end 11, is preferably smaller than in the region of the second cutting edge end 13, in particular at the second cutting edge end 13.

The value of the negative rake angle increases along the cutting edge profile from the first cutting edge end 11 toward the second cutting edge end 13, in particular to the extent that the first clearance angle also increases. The value of the negative rake angle and the first clearance angle thus increase in particular in the same ratio.

It is also already clear from FIG. 1 that the width of the rake face 15 in the region of the first cutting edge end 11, in particular at the first cutting edge end 11, is greater than in the region of the second cutting edge end 13, in particular at the second cutting edge end 13. The width of the rake face 15 also varies continuously along the cutting edge profile, in particular it decreases linearly from the first cutting edge end 11 to the second cutting edge end 13. The rake face 15 can also be referred to as a tracking negative chamfer.

Preferably, the width of the rake face 15 in the region of the second cutting edge end 13 is at least 0.1 mm, preferably at least 0.15 mm, wherein the width of the rake face 15 in the region of the first cutting edge end 11 is at most 0.4 mm, preferably at most 0.3 mm.

It is also clear from FIG. 1 that the rake face 15, starting from the first cutting edge end 11 up to the second cutting edge end 13, effectively assumes a twisted profile, an imaginary normal vector of the rake face 15 extending from the first cutting edge end 11 to the second cutting edge end 13 is rotated outwards in the direction of the outer vicinity of the milling head 1.

It is possible that the cutting edge 9 has a straight, curved, and/or spiral course, in particular in a projection onto a cylindrical peripheral surface encompassing the center axis M. In particular, it may be aligned parallel to the imaginary center axis or may comprise a finite angle with the same.

In the embodiment shown here, the milling head 1 has a main body 19, which preferably comprises solid carbide or consists of solid carbide. The cutting edge 9 here is formed on a soldered on cutting insert 21 connected to the main body 19, in particular on main body 19—preferably by brazing. In particular, a separate cutting insert 21 is provided for each of the four cutting edges 9. This is preferably true regardless of how many cutting edges 9 the milling head 1 actually has. Therefore each cutting edge 9 is always associated with its own cutting insert 21.

The cutting insert 21 preferably comprises or is made from a material selected from a group consisting of cubic boron nitride (CBN), polycrystalline cubic boron nitride (PCBN), and polycrystalline diamond (PCD).

Alternatively, it is also possible that the cutting edge 9 is formed directly on the main body 19, in particular machined from it. In this case, the main body 19 preferably has a solid carbide body and a hard material layer pressed onto the solid carbide body from which the cutting edge 9 has been machined. This hard material layer preferably comprises a material or consists of a material selected from a group consisting of cubic boron nitride (CBN), polycrystalline cubic boron nitride (PCBN), and polycrystalline diamond (PCD).

Figure 2:
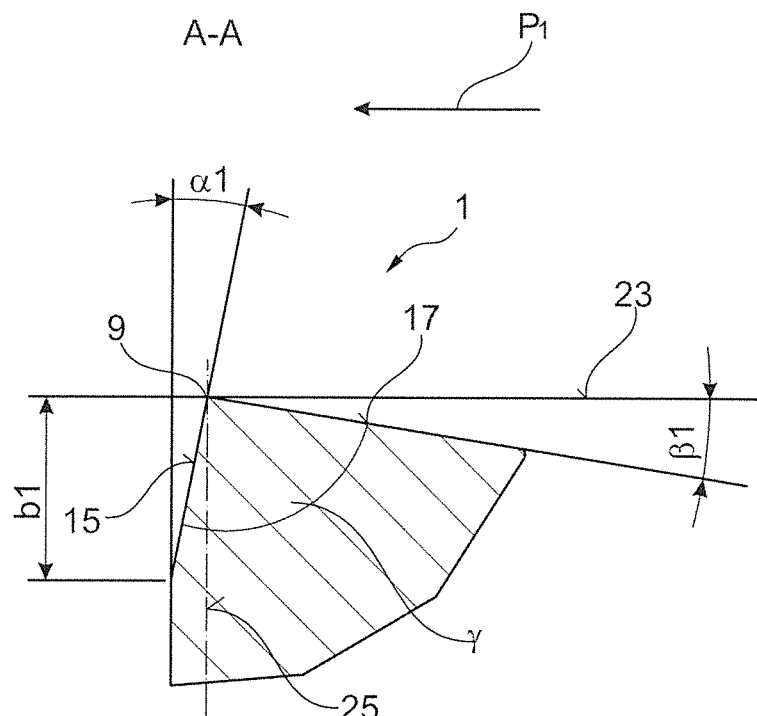
FIG. 2 shows a first detailed cross-sectional view along a first section line A-A shown in FIG. 1.
Figure 3:
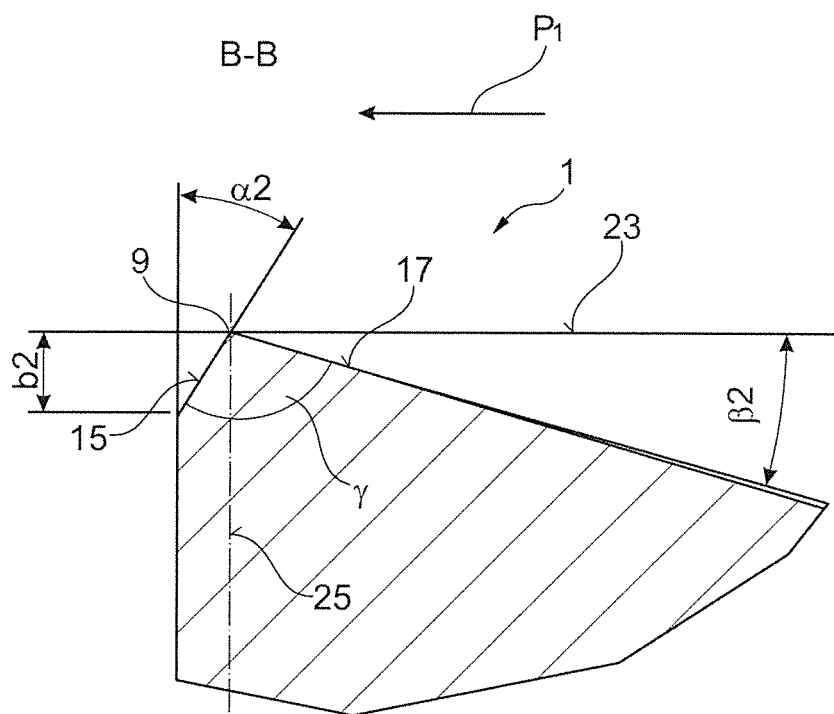
FIG. 3 shows a second detailed cross-sectional view along a second section line B-B shown in FIG. 1.

FIG. 2 shows a detailed cross-sectional view according to a first section line A-A shown in FIG. 1. The first cross-sectional plane illustrated in FIG. 2 is positioned closer to the first cutting edge end 11 than a second cross-sectional plane illustrated in FIG. 3, which is indicated in FIG. 1 by a second section line B-B, wherein the detailed cross-sectional view of FIG. 3 is positioned closer to the second cutting edge end 13.

Identical and functionally identical elements are provided with the same reference signs so reference is made to the previous description in this regard.

In FIG. 2, an imaginary workpiece plane 23 in particular, which can also be designed as a tangential plane to the machined workpiece, and an imaginary plane 25 are shown, the imaginary plane 25 being perpendicular to the imaginary workpiece plane 23, and the imaginary workpiece plane 23 and the imaginary plane 25 intersecting in the cutting edge 9. During the machining of a workpiece, the cutting edge 9 touches the workpiece, in particular at a point of contact that lies both in the imaginary workpiece plane 23 and in the imaginary plane 25, wherein the imaginary workpiece plane 23 is designed in particular as a tangential plane to the workpiece in the point of contact.

The rake angle 15 results as an angle that the rake face 15 forms with the imaginary plane 25, depicted here numerically with the rake angle identical angle $\alpha$ for the sake of simplicity, wherein the identity between the illustrated angle $\alpha$ and the rake angle results from simple geometric considerations. Therefore in the following, for the sake of simplicity, the rake angle is also referred to as rake angle $\alpha$.

An arrow P1 indicates a machining direction of the milling head 1 here, along which the cutting edge 9 is displaced relative to a workpiece. It is clear that the rake face 15 of the imaginary plane 25 and the cutting edge 9 lead in the machining direction. Therefore, the rake angle $\alpha$ is assigned a negative sign.

The first clearance angle $\beta$ is the angle that the flank face 17 forms with the imaginary workpiece plane 23.

Finally, the wedge angle $\gamma$ is the angle that the rake face 15 forms with the flank face 17.

Here, the equation applies that the rake angle $\alpha$—taking into account its sign—the wedge angle $\gamma$ and the first clearance angle $\beta$ add up to 90°, wherein the degree refers to a full circle of 360°.

For example, here the sum of the wedge angle $\gamma$ and the first clearance angle $\beta$ is greater than 90° by the exact value of the negative rake angle $\alpha$, so that exactly 90° results when the value of the rake angle—due to the negative sign, which is associated with the rake angle—is subtracted from the sum of the wedge angle $\gamma$ and the first clearance angle $\beta$.

In FIG. 2, a width b of the rake face 15 is plotted.

As already mentioned, FIG. 3 shows a second detailed cross-sectional view along the second section line B-B shown in FIG. 1.

A comparison of FIGS. 2 and 3 shows that both the value of the negative rake angle $\alpha$ and the value of the first clearance angle $\beta$ are smaller in the region of the first cutting edge end 11 than in the region of the second cutting edge end 13. In particular, they have the first values $\alpha 1$, $\beta 1$ in the sectional plane according to FIG. 2, which are smaller than the second values α2, β2 according to the sectional plane in FIG. 3. However, the change of the rake angle α on the one hand and of the clearance angle β on the other hand is such that the wedge angle γ is constant.

Overall, a comparison of FIGS. 2 and 3 also shows that the cutting geometry is twisted, so to speak, from the first cutting edge end 11 to the second cutting edge end 13, here, in the clockwise direction.

At the same time, given a predetermined cutting edge profile of the cutting edge 9, the width b of the rake face 15 decreases from the first cutting edge end 11 to the second cutting edge end 13. In that regard, the rake face 15 in FIG. 2 has a first, greater width b1 and in FIG. 3, a second, smaller width b2.

The value of the negative rake angle α described here in the region of the first cutting edge end 11, in particular at the first cutting edge end 11, is preferably at least 10° to at most 19°, preferably at least 12° to at most 17°, preferably at least 14° to at most 16°, preferably 15°. In the region of the second cutting edge end 13, in particular at the second cutting edge end 13, it is preferably from at least 20° to at most 30°, preferably from at least 22° to at most 28°, preferably from at least 24° to at most 26°, preferably 25°.

In the region of the first cutting edge 11, in particular at the first cutting edge end 11, the first clearance angle β is preferably from at least 5° to at most 10°, preferably from at least 6° to at most 8°, preferably 7°. In the region of the second cutting edge end 13, in particular on the second cutting edge end 13, it is preferably from at least 15° to at most 20°, preferably from at least 16° to at most 18°, preferably 17°.

In a manner not shown, a second flank face adjoins the first flank face 17 on the circumference, to which a second clearance angle is assigned. This second clearance angle is preferably greater than the first clearance angle β along the cutting edge profile of the cutting edge 9, and particularly preferably is constant along the cutting edge profile. It preferably has a value from at least 16° to at most 21°, preferably of at least 17° to at most 19°, preferably of 18°.

The cutting geometry of the milling head 1 shown here proves to be particularly robust, whereby, in particular, unified wear is created over the profile of the cutting edge 9, so that the service life of the milling head 1 is increased. In addition, vibrations in the machining of a workpiece are reduced, which also has an advantageous effect on the service life of the milling head 1.

The cutting edge 9 is preferably produced by directly grinding the main body 19 or the cutting insert 21, in particular by grinding at least one surface selected from the rake face 15 and the first flank face 17. Preferably, both the rake face 15 and the first flank face 17 are ground to produce the cutting edge 9 as a intersecting line between the rake face 15 and the first flank face 17.

If the cutting insert 21 is ground, this preferably takes place when the cutting insert 21 is already fastened to the main body 19. Alternatively, the cutting insert can also be ground prior to attachment to the main body 19.

The milling head 1 is preferably obtained by manufacturing the cutting edge 9. If needed, it additionally only requires a fastening, in particular a soldering, of the cutting insert 21 to the main body 19 if the cutting insert 21 is ground prior to attachment to the main body 19.

The grinding is preferably carried out with an automated, in particular programmable, grinding machine. In particular, a computer program product is provided for controlling the grinding machine, which has machine-readable instructions on the basis of which a previously described method for producing the cutting edge 9 on the grinding machine is carried out when the computer program product runs on a computer set up to drive the grinding machine.

In that regard, the invention also includes a data carrier with such a computer program product, as well as a grinding machine, which is set up for carrying out the method.

The invention claimed is:

1. A milling head for a ball track milling cutter, the milling head comprising:
    an imaginary center axis;
    a first end being a working-side end and a second end being a clamping-side end opposite the first end relative to the imaginary center axis; and
    at least one geometrically defined cutting edge extending from a first cutting edge end facing the first end of the milling head in a direction of the second end of the milling head to a second cutting edge end facing the second end of the milling head extending along a cutting edge profile of the at least one cutting edge,
    wherein the at least one cutting edge is an intersecting line between a rake face associated with the at least one cutting edge and a first flank face associated with the at least one cutting edge, and
    wherein the at least one cutting edge has a negative rake angle, a first clearance angle, and a wedge angle, a value of the negative rake angle in a first region of the first cutting edge end has a different value than in a second region of the second cutting edge end, the first clearance angle in the first region of the first cutting edge end has a different value than in the second region of the second cutting edge end, and the wedge angle along the cutting edge profile is constant along an entire length from the first cutting edge to the second cutting edge end.

2. The milling head according to claim 1, wherein along the cutting edge profile, there are no two distinct points on the at least one cutting edge where the at least one cutting edge has identical values for at least one of the negative rake angles and the first clearance angles.

3. The milling head according to claim 1, wherein a value of at least one of the negative rake angles and the first clearance angles varies continuously along the cutting edge profile of the at least one cutting edge.

4. The milling head according the claim 1, wherein a value of at least one of the negative rake angles and the first clearance angles varies linearly along the cutting edge profile of the at least one cutting edge.

5. The milling head according to claim 1, wherein a value of the negative rake angle in the first region of the first cutting edge end is smaller than in the second region of the second cutting edge end, and/or the first clearance angle is smaller in the first region of the first cutting edge end than in the second region of the second cutting edge end.

6. The milling head according to claim 1, wherein a value of the negative rake angle increases along the cutting edge profile of the at least one cutting edge to an extent to which the first clearance angle also increases.

7. The milling head according to claim 1, wherein a width of the rake face in the first region of the first cutting edge end is greater than in the second region of the second cutting edge end.

8. The milling head according to claim 1, wherein a first width of the rake face in the first region of the first cutting edge end is at most 0.4 and/or a second width of the rake face in the second region of the second cutting edge end is at least 0.1 mm.

9. The milling head according to claim 1, wherein the cutting edge profile of the at least one cutting edge is selected from a group consisting of straight, curved, spiral, and combinations thereof, and wherein the cutting edge profile extends parallel to the imaginary center axis.

10. The milling head according to claim 1, wherein:
a) the value of the negative rake angle in the first region of the first cutting edge end is from at least 10° to at most 19°and/or in the second region of the second cutting edge end from at least 20° to at most 30° and/or
b) the first clearance angle in the first region of the first cutting edge end is from at least 5° to at most 10° and/or in the second region of the second cutting edge end is from at least 15° to at most 20.

11. The milling head according to claim 1, wherein a second flank face adjoins the first flank face on a circumference, to which a second clearance angle is assigned.

12. The milling head according to claim 11, wherein the second clearance angle along the cutting edge profile is constant.

13. The milling head according to claim 1, wherein the milling head comprises a main body, and wherein the at least one cutting edge is formed:
a) on the main body, or
b) on a cutting insert connected to the main body.

14. The milling head according to claim 1, in combination with a ball track milling cutter.

15. The milling head according to claim 1, wherein the cutting edge profile of the at least one cutting edge is selected from a group consisting of straight, curved, spiral, and combinations thereof, and wherein the cutting edge profile defines an angle relative to the imaginary center axis.

16. The milling head according to claim 11, wherein the second clearance angle is greater than the first clearance angle everywhere along the cutting edge profile.

17. The milling head according to claim 12, wherein the second clearance angle is at least 16° and at most 21°.

18. The milling head according to claim 13, wherein the at least one cutting edge is formed on the cutting insert connected to the main body and soldered to the main body.

* * * * *